Dec. 25, 1923.

B. E. RICHARDSON

TRANSMISSION GEARING

Filed Dec. 5, 1921

Inventor
Bayard E. Richardson
By Frank E. Liverance Jr.
Attorney

Dec. 25, 1923.

1,478,529

B. E. RICHARDSON

TRANSMISSION GEARING

Filed Dec. 5, 1921     2 Sheets-Sheet 2

Inventor
Bayard E. Richardson
By Frank E. Liverance, Jr.
Attorney.

Patented Dec. 25, 1923.

1,478,529

UNITED STATES PATENT OFFICE.

BAYARD E. RICHARDSON, OF GRAND RAPIDS, MICHIGAN, ASSIGNOR TO MECHANO GEAR SHIFT COMPANY, OF GRAND RAPIDS, MICHIGAN, A CORPORATION OF MICHIGAN.

TRANSMISSION GEARING.

Application filed December 5, 1921. Serial No. 519,877.

*To all whom it may concern:*

Be it known that I, BAYARD E. RICHARDSON, a citizen of the United States of America, residing at Grand Rapids, in the county of Kent and State of Michigan, have invented certain new and useful Improvements in Transmission Gearing; and I do hereby declare the following to be a full, clear, and exact description of the invention, such as will enable others skilled in the art to which it appertains to make and use the same.

This invention relates to sliding gear transmissions such as are commonly used in the construction of motor vehicles and is particularly concerned with certain novel improvements in the construction shown in my prior application for patent, Ser. No. 360,928, filed Feb. 24, 1920, wherein an overrunning clutch is made a part of the transmission mechanism, normally being so associated with the transmission mechanism that power imparted thereto from the engine will be transmitted to the propeller shaft of the vehicle, but any tendency of the momentum of the vehicle to drive the transmission mechanism through the propeller shaft is obviated. Further means, however, are provided whereby such driving of the transmission by the momentum of the vehicle may be had when desired, as in those cases where the compression of the engine is to be utilized for braking purposes. In order to do this, in such construction above noted, it was necessary to provide a separate foot operated appliance, which the driver of the vehicle had to keep in mind and operate at the desired times, this making one more control means for the vehicle driver to learn to operate and making the transmission of my invention apparently a different one in principle from other transmissions for the driving of motor vehicles.

In the present invention, the same advantages and results are attained with respect to the transmission mechanism, as set forth in my application for patent above identified, and at the same time, a means for permitting the driving of the transmission mechanism through the momentum of the vehicle is provided operated automatically in connection with and whenever the vehicle is braked to reduce its speed. That is, the operation of the service brake pedal, through connections associated therewith causes the same effect as the separate and distinct control shown and described in my prior application for patent. The elimination of the separate control and the operation of the parts affected thereby automatically on operation of the service brake pedal, insures that the driver of the vehicle will not forget to make the proper control operations at the times needed, and eliminates the necessity of keeping in mind the differences between the ordinary sliding gear transmission and the one which I have invented, in fact, the driver has no need of knowing there is any differences.

My invention has for its object and purpose, the attainment of the above described ends in a very simple manner and with mechanism that is strong and durable and economical to produce. For an understanding of the invention and the constructions embodying the same, reference may be had to the following description, taken in connection with the accompanying drawings, in which, Fig. 1 is a plan of a transmission mechanism, equipped with my invention, the gearing being covered by the casing.

Like reference characters refer to like parts in the different figures of the drawings.

Figure 1:
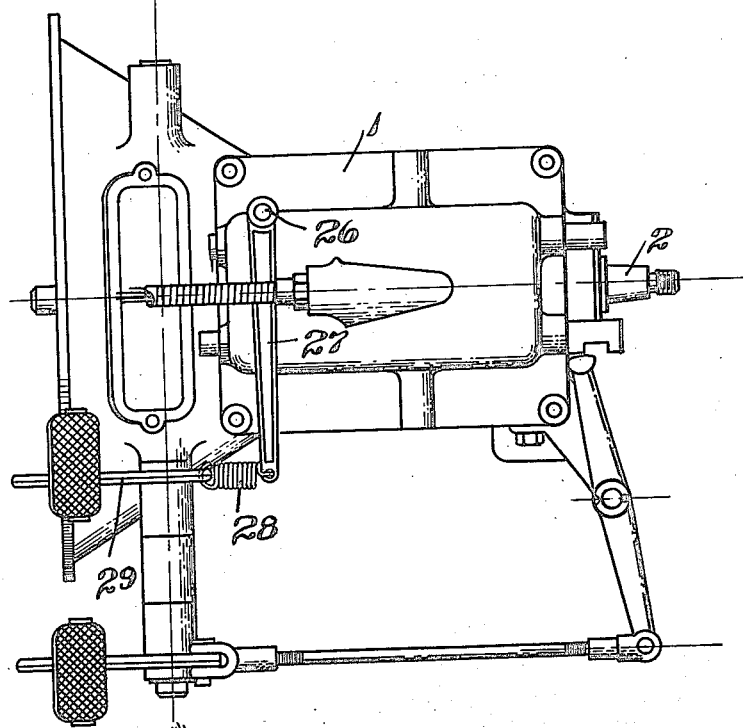
Figure 2:
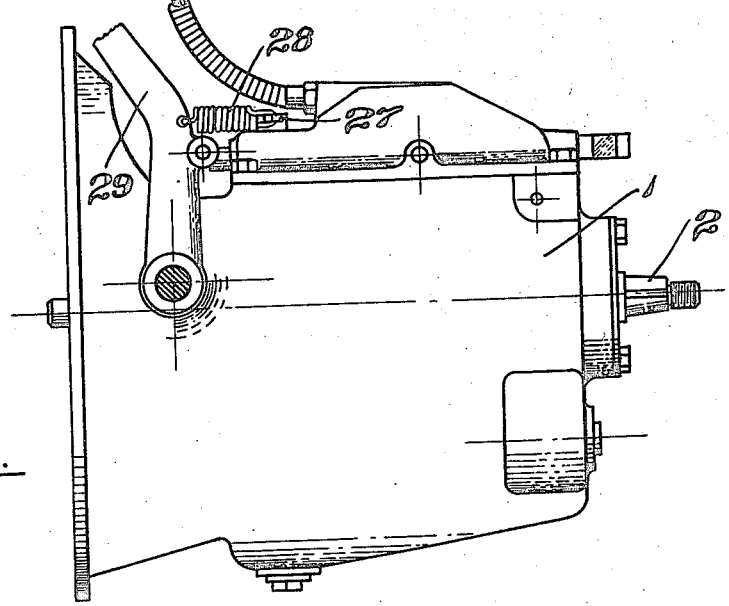
Fig. 2 is a side elevation thereof, the clutch pedal being removed.

The transmission casing 1 is of conventional design, within which the transmission gearing is housed together with the overrunning clutch and shafts to support the same. A shaft 2 is located lengthwise of the casing, at its front end having rotative bearing in the rear end of a shaft 3, adapted in turn to be connected with the engine crank shaft through any suitable clutch, and at its rear end being connected by a universal joint 4 with the propeller shaft of the vehicle with which the transmission is associated. Shaft 2 is square in cross section and on the same two shiftable gears 6 and 7 are slidably mounted.

Below the shaft 2 a rod 8 is located, at its ends being carried in the ends of the casing 1. An elongated sleeve 9 is rotatably mounted on the rear portion of the rod, integral with which two pinions 10 and 11 are formed, one at either side of the gear 7 and with either of which said gear may be engaged on proper sliding movement thereof. It is understood that the actual engagement of the gear 7 when connected with pinion 11 is with an idle pinion which is in engagement always with pinion 11, this being the usual construction for the reverse speed in transmissions of this character, not being specifically shown and described herein as the invention has nothing to do therewith.

A second sleeve 12 of hexagonal cross section is rotatably mounted on the rod 8 at the front portion thereof, at its front end being equipped with a gear 13 which is in engagement with a smaller gear or pinion 14 at the rear end of the shaft 3, a still smaller gear 15 being formed immediately back of the gear 14 over which the annular gear 16 formed at the front end of the front sliding gear 6 may pass to make the connection for direct drive of the propeller shaft from the engine. The sliding gear 6 when moved to its rear operative position engages with a gear 17 provided at the front end of the sleeve 9. Integral with the gear 17 is a forwardly extending short cylindrical clutch member 18, forming one element of the overrunning clutch which is interposed between the two sleeves 9 and 12 mounted on rod 8.

The rear end of the hexagonal sleeve 12 extends into the cylindrical outer clutch member 18, the end of the sleeve forming an inner clutch member. Between the two a roller construction is mounted, including rear and front plates 19 and 20 with a series of six rollers 21, one for each side of the sleeve 12, mounted between them. The rollers are of such size that when centrally located with respect to the hexagonal sides of the sleeve 12, the outer member 18 may freely turn thereover, but when moved to either side, the same wedge between the sides of sleeve 12 and the inner sides of member 18, making a firm connection.

Figure 3:
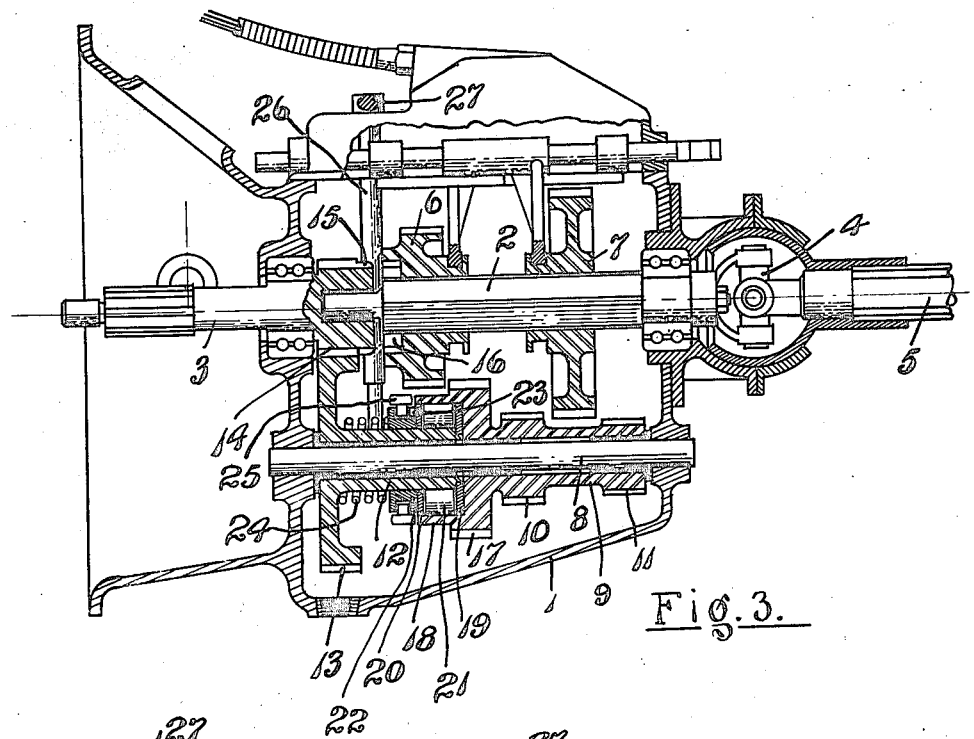
Fig. 3 is a longitudinal vertical section through the transmission mechanism.
Figures 4, 5:
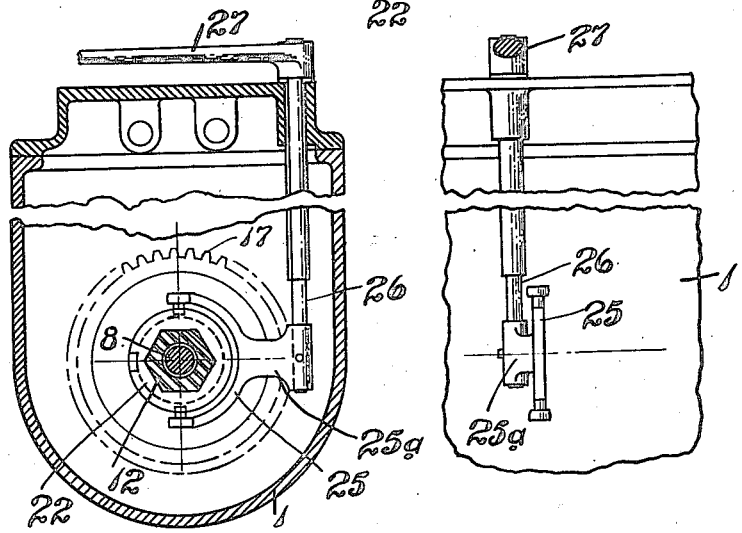
Fig. 4 is a transverse vertical section through the transmission in front of the overruning clutch mechanism therein.
Fig. 5 is a fragmentary elevation looking against the inner side of one of the sides of the transmission casing and showing the operating means for controlling the overrunning clutch.

A collar 22 is slidably mounted on the sleeve 12 in front of the front plate or ring 20, and a pin 23 on said front plate projects into the recess cut in the collar to receive it, as shown in Fig. 3, this recess being so located that with the pin at one end thereof, the rollers 21 are centrally located with respect to the sides of the sleeve 12, permitting the free rotation of member 18 over the rollers, but when at the other end of said recess, the rollers 21 are away from central position and a wedging occurs so that driving of sleeve 12 drives sleeve 9. This has been fully set forth in my former application for patent noted, and need not be further elaborated.

A coiled spring 24 between gear 13 and collar 22 normally holds the collar in rear position. A yoke 25 is associated with and connected to the collar, having a laterally extending arm 25ᵃ which is secured at the lower end of a vertical rod 26, rotatably mounted in and extending through the top of the casing 1. At its upper end above the casing, an arm 27 is permanently secured to the rod, extending across the casing to a point directly behind the brake pedal 29, to which it is connected by a very strong and closely coiled spring 28. This spring, in effect is the same as a rigid bar connection, which might be used, the spring being used by reason of facility of attachment chiefly and ease of construction. It is stronger than the spring 24 which has to be overcome and compressed through force transmitted through the spring 28.

On forward operation of the brake pedal, rod 26 is turned about its vertical axis, and collar 22 moved forward so as to disassociate it from the pin 23, leaving the clutch to operate and connect the sleeves 12 and 9 irrespective of the directions of movement thereof, or which is driving the other. Accordingly, when the brake pedal is operated forward, the momentum of the vehicle drives the transmission, and if the connection with the engine is through either of the gears 10 and 17 with gears 7 or 6, respectively, the compression of the engine acts as a brake against too rapid movement of the vehicle, where otherwise with such gearing connections, the engine would not be affected as sleeve 9 would be driven by the momentum of the vehicle, but no transmission therefore to sleeve 12 takes place. Such disconnection of the sleeves 9 and 12 is desirable under ordinary conditions for gear shifting, but not when the engine is to be utilized for braking purposes, and my invention permits both at the times when they should occur. This follows from the fact that the clutch of the overrunning type disclosed overruns when the momentum of the vehicle is driving the transmission gearing, and the brake pedal is not operated so as to make the clutch effective for driving from both directions; while when the brake pedal is operated forward, the clutch is changed from an overrunning clutch to one which is effective when driven from both directions, interposing a positive drive between the vehicle rear axle and the engine so that the engine may serve as a brake against too great speed as when moving down steep inclines.

The use of the engine for braking purposes will be desirable only when it is right to operate the brake pedal, accordingly the operation of the brake pedal is the effective means for accomplishing automatically what before required a separate operation. While I have shown the brake pedal as the actuating member, other parts of the manually operable brake mechanism, as the emergency brake lever, or both may be used without changing the invention or departing therefrom. Accordingly, I do not wish to be limited to the specific construction shown and described, but consider the invention to comprehend all forms of structure coming within the scope of the appended claims defining the invention.

I claim:

1. In combination, driving and driven shafts, a transmission gearing interposed between the shafts and adapted to connect the same to give a plurality of forward speeds and a reverse speed of the driven shaft with respect to the driving shaft, means within the transmission gearing for positively driving the driven shaft from the driving shaft but rendering ineffective the driving of the driving shaft by the driven shaft on the same direction of movement, brake operating means, and connections between said brake operating means and said first mentioned means for rendering the first mentioned means ineffective automatically with the operation of the brake operating means, whereby the driving and driven shafts are connected irrespective of their direction of movement.

2. In combination, driving and driven shafts, a transmission gearing interposed between the shafts and adapted to connect the same to give a plurality of forward speeds and a reverse speed of the driven shaft with respect to the driving shaft, means within the transmission gearing normally rendering ineffective the driving of the driving shaft by the driven shaft through the gearing, a foot operated brake pedal, and means connecting the same with said first means for rendering the first means automatically ineffective on operation of the foot pedal, whereby the driving and driven shafts are connected irrespective of their direction of movement.

3. In combination in a sliding gear transmission, a horizontally located rod, a sleeve rotatably mounted thereon and covering the rear portion of the rod, said sleeve at its front end carrying a gear and a cylindrical outer clutch member projecting from the gear, a second sleeve on the front portion of the rod and extending at its rear end into said outer clutch member, means for continuously driving the second sleeve, rollers between the second sleeve and the outer clutch member adapted to connect the same on rotation in either direction when free to do so, brake operating means, means associated with the rollers for holding them in an inoperative position when the first sleeve is driven thereby stopping any driving of the second sleeve by the first sleeve, but permitting driving of the first sleeve by the second sleeve, and means connecting the brake operating means and said last named means for moving the last named means to an inoperative position, thereby permitting the connection of the two sleeves, irrespective of which is driving the other.

4. In combination in a sliding gear transmission, a main transmission shaft, a driving shaft in front of and in alinement therewith with which said main shaft is normally loosely connected, sliding gears splined on the main transmission shaft, a jack shaft located below the main shaft, a sleeve mounted on the jack shaft and carrying a plurality of gears with which the sliding gears may be engaged, a second sleeve on the jack shaft, means for continuously driving the same from the driving shaft, a clutch disposed between the two sleeves, means associated with the clutch rendering ineffective the driving of second sleeve by the first sleeve but permitting the driving of the first sleeve by the second sleeve, brake operating means, and connections between said brake operating means and said means associated with the clutch for rendering the latter ineffective on operation of the brake operating means, whereby either sleeve may drive the other.

5. In a sliding gear transmission, a main transmission shaft, a driving shaft in alinement therewith and normally loosely connected to the main transmission shaft, gears splined on the main transmission shaft, a jack shaft, a front and a rear sleeve mounted on the jack shaft, means for driving the front sleeve from the driving shaft, gears on the second shaft with which the gears on the main transmission shaft may be engaged, a clutch between the two sleeves, a collar associated with the clutch and movably mounted on one of the sleeves, said collar in its normal position acting on the clutch to prevent driving of the front sleeve by the rear sleeve but permitting driving of the rear sleeve by the front sleeve, a rod positioned vertically in the transmission and extending above the same, a yoke connected to the lower end of the rod at one end and to the collar at the other end, brake operating means, and connections between the same and said rod for turning the rod partially on operation of the brake operating means to move the collar away from and out of association with the clutch, thereby rendering the clutch effective to connect the sleeves irrespective of which is the driven or driving sleeve.

6. A motor vehicle transmission comprising means for effecting a plurality of forward speeds and a reverse speed between the engine and propeller shaft of the vehicle, means included in the transmission for rendering ineffective the driving of the engine by the propeller shaft from momentum of the vehicle, brake operating means for the vehicle, and means connected with and automatically operated by the brake operating means for rendering effective the driving of the engine by the propeller shaft, as well as the propeller shaft by the engine.

In testimony whereof I affix my signature.

BAYARD E. RICHARDSON.